ABSTRACT

United States Patent [19]
Gassmann

[11] 3,808,560
[45] Apr. 30, 1974

[54] APPARATUS FOR PROVIDING AN ANALOG OR THE LIKE OF THE ANGULAR VELOCITY OF A ROTATING BODY

[75] Inventor: Gerhard Günter Gassmann, Berkheim, Germany

[73] Assignee: ITT Industries, Inc., New York, N.Y.

[22] Filed: Aug. 2, 1972

[21] Appl. No.: 277,369

[30] Foreign Application Priority Data
Aug. 2, 1971  Germany............................ 2138612

[52] U.S. Cl..................... 332/44, 84/1.28, 310/168, 328/133, 332/45 R
[51] Int. Cl. ........................ H03c 1/52, G10h 3/04
[58] Field of Search............. 332/44, 45 R; 328/133, 328/134; 310/155, 168; 84/1.28

[56] References Cited
UNITED STATES PATENTS

| | | | |
|---|---|---|---|
| 2,095,758 | 10/1937 | Mabry............................... | 332/45 X |
| 3,230,407 | 1/1966 | Marsh................... | 310/168 |
| 3,243,731 | 3/1966 | Erickson.......................... | 332/45 X |
| 3,319,189 | 5/1967 | Silverman..................... | 332/45 |
| 3,588,720 | 6/1971 | Fluhr............................. | 328/133 X |
| 3,464,016 | 8/1969 | Kerwin et al. ................. | 328/133 X |

*Primary Examiner*—Alfred L. Brody
*Attorney, Agent, or Firm*—A. Donald Stolzy

[57] ABSTRACT

Two magnetic pickups are fixed around a toothed, ferromagnetic rotating wheel in positions such that they produce output signals which are approximately sine wave in shape and in phase quadrature. Each pickup output is introduced to a different corresponding multiplicative mixer. One mixer receives a carrier input in addition. The other mixer receives the carrier shifted in phase by 90°. The outputs of mixers are introduced to an adder. The output of the adder is then free of carrier upper sideband. The lower sideband may then, if desired, be transmitted over long distances without a loss of accuracy. A.D.C. voltage, if desired, may then be developed directly proportional to the frequency of the lower sideband by a frequency discriminator. This voltage is then directly proportional to the wheel velocity. Moreover, the resolution of this volocity analog is high and to within one cycle of the high carrier frequency.

16 Claims, 4 Drawing Figures

APPARATUS FOR PROVIDING AN ANALOG OR THE LIKE OF THE ANGULAR VELOCITY OF A ROTATING BODY

BACKGROUND OF THE INVENTION

The present invention relates to apparatus for producing angular velocity analogs, and more particularly, to systems for producing an analog signal having a magnitude directly proportional to the angular velocity of a rotating body.

The present invention is especially adapted to produce a high resolution analog signal which can be accurately transmitted over long distances.

The invention may, thus, be employed to detect rapid changes in speed. Speed changes of moving bodies are generally sensed by means of force sensors because the speed changes inevitably cause braking or accelerating forces. However, these known methods have the disadvantage that the speed change corresponds to a change in an electrical quantity such as a change in an electrical voltage, which change is small and difficult to measure. In many cases a digital representation of the measured quantity is desired. In the past this has been accomplished by producing alternating voltages through the use of photoelectric or magnetic pickups. Speed changes are then sensed as a pickup output frequency changes. In practice this equipment has its limit because scanning patterns may not be made with extremely small teeth because of dirt, water and the like, then easily disrupt a pickup output. If the scanning pattern is very coarse, e.g., in the form of a toothed disk with a tooth spacing of a few millimeters, a very accurate measurement of a speed change is impossible because the measurement result depends on the time spacing between two successive pulses at a pickup output. Unfortunately, in positional control systems or similar applications such as anti-skid braking systems, it is required that speed changes be sensed with in a period of time which is considerably shorter than the pulse periods produced by the scanning.

In the past it has been the practice to use two pickups, e.g., photocells or magnetic heads, for the scanning of a scanning pattern and to stagger these two indicators so that the delivered pulse voltages or sinusoidal voltages are in phase quadrature. However, this has generally been applied only where, in addition to the amount of speed to be sensed, the direction is also to be determined.

SUMMARY OF THE INVENTION

According to the invention, high resolution is achieved by producing a lower carrier frequency sideband which varies in direct proportion to the frequency at each of the outputs of two magnetic pickups.

By single-sideband modulation of a high carrier frequency with alternating voltages delivered by the pickups, a voltage having the frequency $\Omega_1 = \Omega - \omega$ or $\Omega_2 = \Omega + \omega$ is obtained, where $\omega$ is pickup output radian frequency and $\Omega$ is the carrier radian frequency.

The frequency $\Omega_1$ has many cycles within one cycle of the alternating voltages delivered by the pickups. In the known single-sideband modulation of a carrier frequency by means of an A.F. signal such as a speech signal, time delays are obtained by part of the A.F. signal being placed in phase quadrature within the largest possible frequency range with the aid of a complicated filter. This problem is never exactly solvable because only an approximation for a certain frequency range is possible. In contrast, in the present case, a quadrature condition of the two audiofrequency alternating voltages is established by the use of two pickups arranged so that the delivered alternating voltages necessarily remain in phase quadrature in any case and, consequently, at all frequencies, e.g., at extremely low ones. Hence, unlike in the known circuits for single-sideband modulation, no time delay is used, so that only instantaneous values are processed and, consequently, the instantaneous frequency $\Omega_1 = \Omega - \omega$ follows the change of $\omega$ inertialessly. Since, however, $\Omega_1$ has a considerably higher resolution, i.e., considerably more radian per second than $\omega$, it is thus possible to sense variations of the alternating voltages from the sinusoidal form by changes of $\omega$ and to thus determine instantaneous values which lie far within a cycle of the alternating voltages delivered by, for example, magnetic pickups.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

Figure 1:
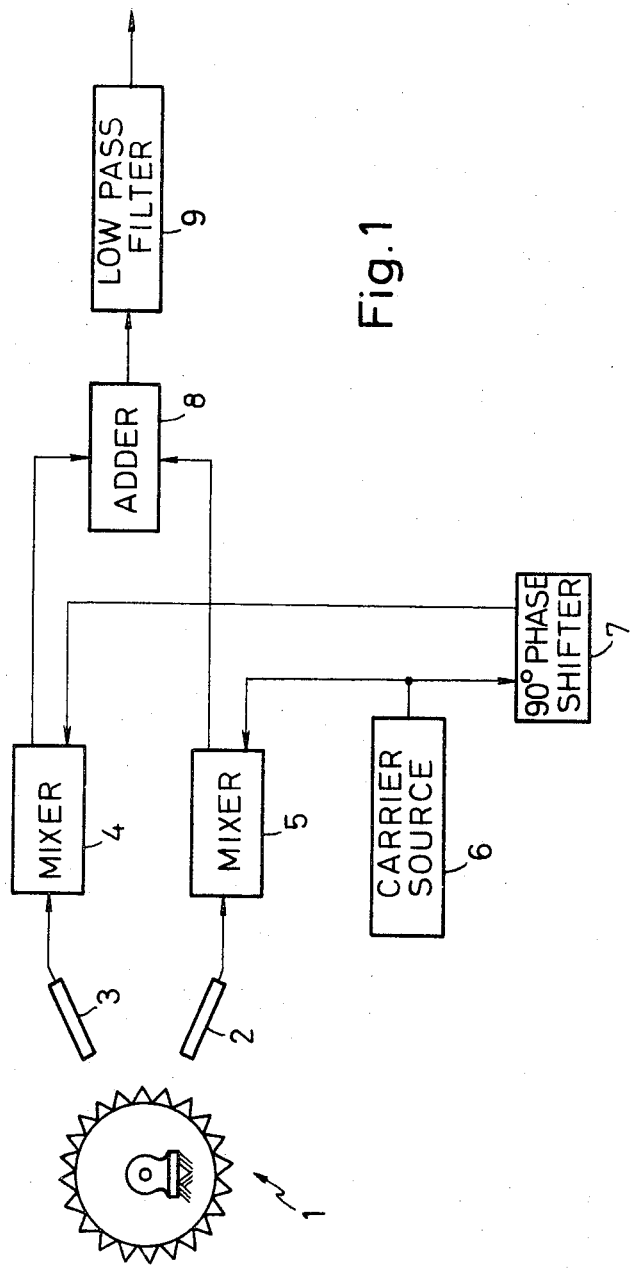
FIGS. 1 and 2 are block diagrams of one embodiment of the present invention.
Figure 2:
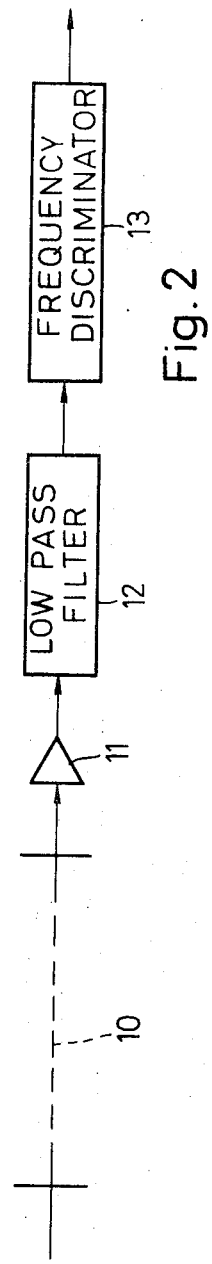

FIG. 1 shows an arrangement according to the present invention. Designated 1 is a toothed ferromagnetic disk, which is fixed to, for example, the wheel of a land vehicle. In this example, 2 and 3 are two magnetic pickups, which, if the disk 1 rotates at a constant speed, deliver sinusoidal voltages in response to the teeth passing by. To accomplish this, the teeth may be suitably shaped, or, at the expense of a corresponding reduction of the output amplitude, the distance of the pickups from the toothed disk can be chosen so that the output voltages are sinusoidal with very good approximation. The sinusoidal voltages delivered by the pickups 2 and 3 are applied to the multiplicative mixers 4 and 5. Designated 6 is a source of a carrier frequency signal. The output signal of source 6 is a sine wave of a constant frequency. The alternating voltage delivered by source 6 is applied directly to a mixer 5 and, via a 90° phase shifter 7, to the other mixer 4. The output voltages of the two mixers 4 and 5 are added in an adder 8 to form sum voltage. This sum voltage has the frequency $\Omega_1 = \Omega - \omega$. If desired, a low pass filter 9 may be connected from the output of adder 8 to attenuate frequencies higher than the maximum expected frequency of $\Omega_1$. Filter 9 may have a cutoff frequency between $\Omega_1$ and $\Omega$, between $\Omega$ and $\Omega_2$, or at $\Omega$, if desired. The thus obtained digital signal having the frequency $\Omega_1 = \Omega - \omega$ may be transmitted over a transmission path of any length, as shown at 10 in FIG. 2. At the end of the transmission path 10, the signal may be amplified in an amplifier 11. Another filter 12, identical to filter 9, if desired, may be connected from amplifier 11. Filter 12 may be employed to free the signal from noise and interference voltages developed on the transmission path. For final evaluation, the digital signal may be converted into an analog signal with a frequency discriminator 13. The output signal of filter 9 is especially useful in that it is considerably less susceptible to interference than a D.C. current of voltage transmitted over the long transmission path 10.

In accordance with the foregoing, variations in the speed of disk 1 can be readily evaluated within one cycle of the voltages delivered by the magnetic pickups 2 and 3.

In the following, an equation is developed for the output of adder 8:

$$U_1 = U \cdot \sin\omega t$$

$$U_2 = U \cdot \cos \omega t$$

$$U_{H1} = U_H \cdot \sin \Omega t$$

$$U_{H2} = U_H \cdot \cos \Omega t$$

$$U_{M4} = U \cdot U_H \cdot \sin\Omega t \cdot \sin\omega t = (U \cdot U_H/2)\,[\cos(\Omega - \omega)\,t - \cos(\Omega + \omega)\,t]$$

$$U_{M5} = U \cdot U_H \cdot \cos\Omega t \cdot \cos\omega t = (U \cdot U_H/2)\,[\cos(\Omega - \omega)\,t + \cos(\Omega + \omega)\,t]$$

$$U_{M4} + U_{M5} = (U \cdot U_H/2)\,[2\cos(\Omega - \omega)\,t] = U \cdot U_H \cdot \cos(\Omega - \omega)\,t = U \cdot U_H \cdot \cos \Omega_1 t$$

where,
$U_1$ is the output of pickup 2,
$U_2$ is the output of pickup 3,
$U_{H1}$ is the output of phase shifter 7,
$U_{H2}$ is the output of source 6,
$U_{M4}$ is the output of mixer 4,
$U_{M5}$ is the output of mixer 5, and
$U_{M4} + U_{M5}$ is the output of adder 8.

Note that the upper sideband is missing from the output of adder 8.

Since $U_2 = U \cdot \cos\omega t$ is formed with a separate pickup rather than by phase shifting the voltage $U_1 = U \cdot \sin\omega t$ with the aid of a 90° phase shift causing a time delay, as is otherwise the case in single sideband modulation, even very fast variations of the angular velocity can be sensed by regarding $\omega$ as a function of the time $\omega = \omega(t)$ rather than as a constant. Assuming, for example, the extreme case that the wheel 1 is stopped absolutely inertialessly from a certain rotational speed to zero, this means that after the stop $U_1 = U \cdot \sin \Psi_1$, where $\Psi_1$ may be any angle. In this case, $\omega(t) = \Psi_1/t$. Substituting this value into the sum voltage $$U_{M4} + U_{M5} = U \cdot \cos(\Omega - \omega)\,t$$

yields $$U_{M4} + U_{M5} = U \cdot U_H + \cos(\Omega t + \Psi_1).$$

This example shows that, if $\omega$ jumps abruptly from a constant value to the value $\Psi_1/t$, the frequency of the sum voltage jumps over just as inertialessly. In practice, deceleration at an infinite rate is, of course, impossible. By this example, however, it is shown that the frequency of the sum voltage adjusts far within a cycle of $\omega$ to the respective instantaneous value.

The above methematical relation can also be interpreted otherwise: If $\Psi_1$ is a function of the time $\Psi_1 = \Psi_1(t)$, the phase angle of the sum voltage is inertialessly identical to the phase angle of $U_1$, i.e., to the alternating voltage of one of the two pickups.

Figure 3A:
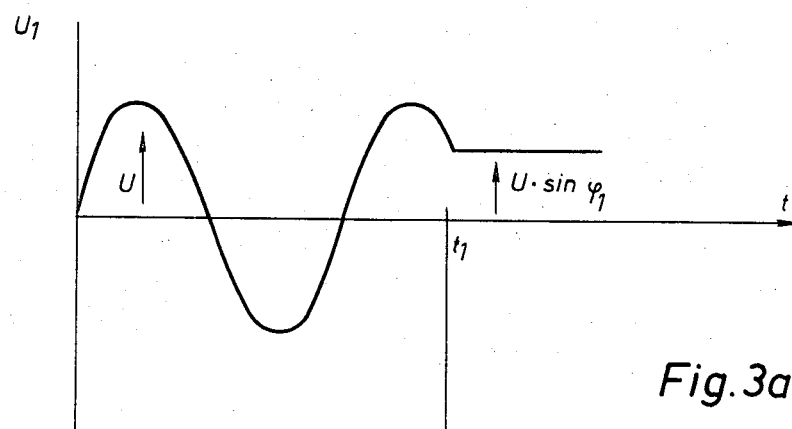
FIGS. 3a and 3b are graphs of the waveforms characteristic of the operation of the invention.
Figure 3B:
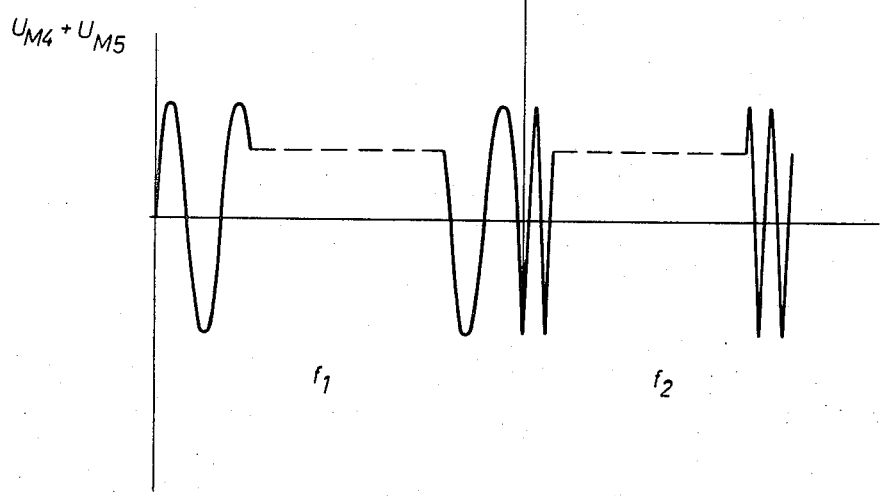

In FIG. 3a, $U_1$ is plotted against time. It is assumed that the rotating disk 1 is suddenly stopped to zero at the instant 11. The maximum of the sinusoidal voltage is $U$, while the amplitude after the instant $t_1$ is $U \cdot \sin \Psi_1$. FIG. 3b shows the sum voltage $U_{M4} + U_{M5}$. From the instant $t_1$, the frequency of this sum voltage is abruptly by the value $\omega$ higher than previously.

From FIG. 3b it follows that $f_1$ is the difference frequency $(\Omega - \omega)$ before the instant $t_1$, while at the instant $t_1$ the frequency $\omega$ becomes zero and the difference frequency is $f_2 = \Omega - 0 = \Omega$, i.e., the carrier frequency of source 6.

In FIG. 1, pickups 2 and 3 will produce quadrature output signals on a number of conditions. For example, if pickups 2 and 3 are identical, pickup 3 may be spaced from pickup 2 an angle in the direction of motion of disk 1 approximately equal to $\theta_p$ where $\theta_p = (n - \frac{1}{4})\theta_t$ where,
$n$ is any positive integer, and
$\theta_t$ is the angle between each pair of immediately adjacent teeth on disk 1.

Note will be taken that the single sideband modulator of the present invention has another advantage. Specifically, it is especially efficient because it conserves power. That is, the power in the upper sideband is saved. Note will be taken that the power in the upper sideband is not used and is, therefore, not necessary.

In prior developments, when $U_1 = 0$, $U_{H1} = 0$. This is not necessarily true. However, any phase difference between $U_1$ and $U_{H1}$ will not cause any substantial change in the proof. Only the lower sideband is phase shifted by a constant amount.

In accordance with the foregoing, $U_{H1}$ and $U_{H2}$ may be written respectively as $$U_{H1a} = U_H \sin(\Omega t + \gamma)$$

where,
$\gamma$ is the phase shift, and
$U_{H2a} = U_H \cos(\Omega t + \gamma)$.
Then $U_{M4a} = U_1 U_{H1a}$, $U_{M5a} = U_2 U_{H2a}$, and $U_{M4a} + U_{M5a} = UU_H \cos[(\Omega - \omega)\,t + \gamma]$.

Mixers 4 and 5 may be entirely conventional amplitude modulators, if desired.

What is claimed is:

1. Apparatus for producing a high resolution alternating output signal of a high frequency directly proportional to angular velocity, said apparatus comprising: a base; a body rotatable on said base; an articulated member fixed relative to said body; pickup means fixed relative to said base in a position for cooperation with said member to produce at least a first alternating signal of a frequency $\omega$ directly proportional to the angular velocity of said body; a source of a second alternating signal of a constant frequency $\Omega$ independent of $\omega$; and output means connected from said pickup means and from said source for producing a third alternating signal directly proportional to the difference between said frequencies $\omega$ and $\Omega$.

2. The invention as defined in claim 1, wherein said articulated member includes a ring of equally spaced ferromagnetic teeth fixed relative to said body in a position concentric with the rotational axis thereof, said pickup means including first and second magnetic pickups fixed relative to said base at different positions around said ring of teeth, said second pickup being angularly spaced from said first pickup in the direction of motion of said body an angle approximately equal to $\theta_p$ where $$\theta_p = (n - \tfrac{1}{4}) \theta_t$$

$n$ is any positive integer, and $\theta_t$ is the spacing between each pair of immediately adjacent teeth, said output means including an adder, first and second multiplicative mixers connected from the output of said first and second pickups, respectively, to two respective inputs of said adder, a 90° phase shifter, the output of said source being connected to another input of said first mixer and to the input of said phase shifter, the output of said phase shifter being connected to another input of said second mixer.

3. Apparatus for producing a high resolution alternating output signal of a high frequency directly proportional to angular velocity, said apparatus comprising: a base, a body rotatable on said base; an articulated member fixed relative to said body; pickup means fixed relative to said base in a position for cooperation with said member to produce at least a first alternating signal of a frequency $\omega$ directly proportional to the angular velocity of said body; a source of a second alternating signal of a constant frequency $\Omega$ independent of $\omega$; and output means connected from said pickup means and from said source for producing a third alternating signal directly proportional to the difference between said frequencies $\omega$ and $\Omega$, said articulated member body in a position concentric with the rotational axis thereof, said pickup means including first and second magnetic pickups fixed relative to said base at different positions around said ring of teeth, said second pickup being angularly spaced from said first pickup in the direction of motion of said body an angle approximately equal to $\theta_p$ where $$\theta_p = (n - \tfrac{1}{4}) \theta_t$$

$n$ is any positive integer, and $\theta_t$ is the spacing between each pair of immediately adjacent teeth, said output means including an adder, first and second multiplicative mixers connected from the output of said first and second pickups, respectively, to two respective inputs of said adder, a 90° phase shifter, the output of said source being connected to another input of said first mixer and to the input of said phase shifter, the output of said phase shifter being connected to another input of said second mixer, a low pass filter being connected from the output of said adder, and a frequency discriminator being connected from the output of said low pass filter.

4. The invention as defined in claim 1, wherein said pickup means includes a first pickup for producing said first signal and a second pickup for producing a first auziliary alternating signal of the same frequency $\omega$, but leading said first signal in phase by 90°, said output means including first and second multiplicative mixers connected from the outputs of said first and second pickups, respectively, first auxiliary means connected from said source for impressing a second auxiliary alternating signal of said frequency $\Omega$ on said first mixer, second auxiliary means for impressing a third auxiliary alternating signal of said freuqency $\Omega$ on said second mixer, said third auxiliary signal leading said second auxiliary signal in phase by 90°, and an adder connected from both of the outputs of said mixers.

5. Apparatus for producing a high resolution alternating output signal of a high frequency directly proportional to angular velocity, said apparatus comprising: base; a body rotatable on said base; an articulated member fixed relative to said body; pickup means fixed relative to said base in a position for cooperation with said member to produce at least a first alternating signal of a frequency $\omega$ directly proportional to the angular velocity of said body; a source of a second alternating signal of a constant frequency $\Omega$ independent of $\omega$; and output means connected from said pickup means and from said source for producing a third alternating signal directly proportional to the difference between said frequencies $\omega$ and $\Omega$, said pickup means including a first pickup for producing said first signal and a second pickup for producing a first auxiliary alternating signal of the same frequency $\omega$, but leading said first signal in phase by 90°, said output means including first and second multiplicative mixers connected from the outputs of said first and second pickups, respectively, first auxiliary means connected from said source for impressing a second auxiliary alternating signal of said frequency $\Omega$ on said first mixer, second auxiliary means connected from said source for impressing a second auxiliary alternating signal of said frequency $\Omega$ on said first mixer, second auxiliary means for impressing a third auxiliary alternating signal of said frequency $\Omega$ on said second mixer, said third auxiliary signal leading said second auxiliary signal in phase by 90°, and an adder connected from both of the outputs of said mixers, a low pass filter and a frequency discriminator being connected in that order from the output of said adder.

6. The invention as defined in claim 5, wherein said filter has a cutoff frequency between about $\Omega$ and the maximum of the difference frequency, $(\Omega - \omega)$.

7. A single sideband modulator comprising: first means for producing a first output signal approximately proportional to $U_1$ where
  $U_1 = U \sin\omega t$,
  $U$ is a constant,
  $\omega$ is a radian frequency, and
  $t$ is time;
second means for producing a second output signal approximately proportional to $U_2$ where $U_2 = U \cos\omega t$; third means for producing a third output signal approximately proportional to $U_{H1a}$ where
  $U_{H1a} = U_H \sin(\Omega t + \gamma)$,
  $U_H$ is a constant,
  $\Omega$ is a radian frequency, and
  $\gamma$ is a constant;
fourth means for producing a fourth output signal approximately proportional to $U_{H2a}$ where $U_{H2a} = U_H \cos(\Omega t + \gamma)$; fifth means connected from said first and third means for producing a fifth signal approximately proportional to the first product $U_1 U_{H1a}$; sixth means connected from said second and fourth means for producing a sixth signal approximately proportional to a second product $U_2 U_{H2a}$; seventh means connected from said fifth and sixth means for producing a seventh signal approximately proportional to the sum of said first and second products, said sum being equal to $$U_{M4a} + U_{M5a} = U U_H \cos[(\Omega - \omega) t + \gamma]$$

where
  $U_{M4a} = U_1 U_{H1a}$, and
  $U_{M5a} = U_2 U_{H2a}$;
a low pass filter having an input lead and an output lead; and a frequency discriminator having an input lead and an output lead, said seventh means having an output lead, said filter input lead being connected from said seventh means output lead, said frequency discriminator input lead being connected from said filter output lead.

8. The invention as defined in claim 7, wherein the frequency $\Omega$ is substantially larger than the largest expected frequency $\omega$.

9. The invention as defined in claim 8, wherein said low pass filter has a cutoff frequency between about the highest expected difference frequency, $(\Omega - \omega)$, and the lowest expected sum frequency, $(\Omega + \omega)$.

10. The invention as defined in claim 1, including a frequency discriminator responsive to said third alternating signal.

11. The invention as defined in claim 2, including a frequency discriminator responsive to the output of said adder.

12. The invention as defined in claim 4, including a frequency discriminator responsive to the output of said adder.

13. Apparatus for producing a high resolution alternating output signal of a high frequency directly proportional to angular velocity, said apparatus comprising a base; a body rotatable on said base; an articulated ferromagnetic member fixed relative to said body, said articulated member including a ring of equally spaced ferromagnetic teeth fixed to said body in a position concentric with the rotational axis thereof; a first magnetic pickup fixed relative to said base in a position for cooperation with said member to produce a first alternating signal of a first frequency directly proportional to the angular velocity of said body; a first source of a second alternating signal of a constant second frequency; a second source of a third alternating signal of said first frequency operably synchronously with said first pickup, said third signal being 90° out of phase with said first signal; and output means connected from said first pickup and said second and third sources for producing a fourth alternating signal directly proportional to the difference between said first and second frequencies, said output means including first and second multiplicative mixers connected from the respective outputs of said first pickup and said second source, said output means including first auxiliary means connected from said first source for impressing a first auxiliary alternating signal of said second frequency on said first mixer, said output means including second auxiliary means for impressing a second auxiliary alternating signal of said second frequency on said second mixer, said first and second auxiliary signals being 90° out of phase with each other, said output means including an adder connected from both of the outputs of said mixers.

14. The invention as defined in claim 13, wherein said second source includes a second magnetic pickup angularly spaced from said first pickup and fixed relative to said base in a position for cooperation with said articulated member to produce said third signal.

15. The invention as defined in claim 14, wherein a frequency discriminator is provided that is responsive to the output of said adder.

16. The invention as defined in claim 13, wherein a frequency discriminator is provided that is responsive to the output of said adder.

* * * * *